United States Patent [19]

Cur et al.

[11] Patent Number: 5,345,814
[45] Date of Patent: Sep. 13, 1994

[54] METHOD AND APPARATUS FOR TESTING VACUUM INSULATION PANEL QUALITY

[75] Inventors: Nihat O. Cur, Royalton Township; David B. Kirby, St. Joseph Township, both of Berrien County, Mich.

[73] Assignee: Whirlpool Corporation, Benton Harbor, Mich.

[21] Appl. No.: 86,762

[22] Filed: Jul. 6, 1993

Related U.S. Application Data

[63] Continuation of Ser. No. 635,489, Dec. 28, 1990, abandoned.

[51] Int. Cl.$^5$ .............................................. G01M 3/34
[52] U.S. Cl. .......................................... 73/49.3; 73/52
[58] Field of Search ...................... 73/49.3, 52, 40.7; 313/570, 572, 573

[56] References Cited

U.S. PATENT DOCUMENTS

| | | | |
|---|---|---|---|
| 2,156,369 | 5/1939 | Bay | 313/570 |
| 2,939,811 | 6/1960 | Dillon | 154/45 |
| 3,264,165 | 11/1964 | Stickel | 161/43 |
| 3,555,884 | 1/1971 | Yamamoto et al. | 73/49.3 |
| 3,743,831 | 7/1973 | Lempka | 250/425 |
| 3,837,215 | 9/1974 | Massage | 73/49.3 |
| 3,888,111 | 6/1975 | Craig | 73/40.7 |
| 3,891,883 | 6/1975 | Ahmed | 313/570 |
| 3,918,293 | 11/1975 | Feigel | 73/52 |
| 3,956,923 | 5/1976 | Young et al. | 73/49.3 |
| 4,024,956 | 5/1977 | Cassidy | 73/52 |
| 4,158,960 | 6/1979 | White et al. | 73/49.3 |
| 4,188,819 | 2/1980 | Egee et al. | 73/52 |
| 4,245,179 | 1/1981 | Buhrer | 315/248 |
| 4,247,800 | 1/1981 | Proud et al. | 313/54 |
| 4,356,721 | 11/1982 | White et al. | 73/49.3 |
| 4,426,876 | 1/1984 | Kakumoto | 73/49.3 |
| 4,463,277 | 7/1984 | DeCaro | 313/25 |
| 4,507,114 | 3/1985 | Bohman et al. | 73/49.3 |
| 4,668,551 | 5/1987 | Kawasaki et al. | 428/69 |
| 4,681,788 | 7/1987 | Barito et al. | 428/68 |
| 4,715,215 | 12/1987 | Perhach et al. | 73/45.4 |
| 4,774,830 | 10/1988 | Hulsman | 73/49.3 |
| 4,776,207 | 10/1988 | Holme | 73/40.7 |
| 4,791,805 | 12/1988 | Gates | 73/40.7 |
| 4,798,753 | 1/1989 | Abauf et al. | 428/69 |
| 4,845,977 | 7/1989 | Aarts | 73/49.3 |
| 4,858,463 | 8/1989 | Rosse et al. | 73/49.3 |
| 4,920,785 | 5/1990 | Etess | 73/49.3 |
| 5,010,761 | 5/1991 | Cohen et al. | 73/40.7 |
| 5,029,463 | 7/1991 | Schvester et al. | 73/40.7 |
| 5,029,464 | 7/1991 | Lehmann | 73/52 |
| 5,042,291 | 8/1991 | Lehmann | 73/52 |

FOREIGN PATENT DOCUMENTS

| | | | |
|---|---|---|---|
| 2004257 | 3/1969 | France | 73/52 |
| 0036084 | 9/1975 | Japan | 73/49.3 |
| 0610590 | 12/1976 | U.S.S.R. | 73/52 |

*Primary Examiner*—Michael J. Tokar
*Assistant Examiner*—Raymond Y. Mah
*Attorney, Agent, or Firm*—Hill, Steadman & Simpson

[57] ABSTRACT

A method of verifying the integrity of the walls and seals of a sealed container is provided in which a low molecular weight gas is introduced into the interior of the container before the container is sealed. After sealing, the container either alone, or in batches with others, is placed into a chamber which is evacuated of gases to a pressure level below that interior of the container and is evacuated of the low molecular weight gas to a partial pressure below that which the gas has within the container. Subsequently the gas within the chamber is sensed to determine whether the rate of increase of the low molecular weight gas in the chamber exceeds a predetermined rate.

13 Claims, 7 Drawing Sheets

METHOD AND APPARATUS FOR TESTING VACUUM INSULATION PANEL QUALITY

This is a continuation, of application Ser. No. 07/635,489, filed Dec. 28, 1990 now abandoned.

BACKGROUND OF THE INVENTION

The present invention relates to a sealed container and a method and apparatus for testing the integrity of the sealed container and more particularly relates to an evacuated container and a method and apparatus for testing an evacuated container.

In many applications it is desireable to evacuate a container and to hermetically seal the container and maintain the evacuated and sealed nature of the container over a long period of time. An example of such a container is a vacuum insulation panel such as those disclosed in U.S. Pat. Nos. 4,668,551 and 4,681,788. Such vacuum insulation panels are suggested for use in refrigerator/freezer cabinet walls to reduce heat load on the refrigeration system; thereby achieving substantial product energy usage reductions. Successful application of vacuum insulation panels in the refrigerator/freezer walls require that an acceptable vacuum level inside the panel be maintained for twenty years or longer. Any loss of vacuum beyond acceptable limits would seriously degrade the product performance. Once the vacuum insulation panels are placed into the refrigerator/freezer walls, it would be extremely difficult to determine the integrity of the insulation system (other than catastrophic failures), short of testing every product for energy consumption. Since there are more than ten million refrigerators produced in the United States on an annual basis, such testing would be impractical. Further, even if a defective panel were located by such testing, replacement of the panel would cause severe damages, if not destruction, of many components of the refrigerator/freezer.

Therefore there is a need to provide a technique to test vacuum insulation panels before they are applied to the refrigerator/freezer cabinets. There is a similar need to provide a technique to test other types of evacuated containers. Since such vacuum insulation panels need to be manufactured in very large numbers at very high speeds, any test technique has to be accurate enough to test the vacuum insulation panels in a very rapid manner.

SUMMARY OF THE INVENTION

The present invention provides an improved vacuum insulation panel and a method for testing vacuum insulation panels for leaks by inserting into the panel, at low pressure, a test gas and then after the panel has been sealed, measuring any escaping gas. The test gas preferred would be a low molecular weight, easily detectable gas such as helium. Helium is chosen as a test gas due to the fact that it is completely inert and is present at very low concentrations in ambient air. Also, because of helium's low molecular weight, it flows more rapidly through very small leaks and permeates more rapidly through solid barrier plastics than other gases. This invention is not limited to using helium as a test gas for leak detection, yet, helium is a preferred gas and will be used in the discussion of the present invention.

Similarly, the method described herein as to how to fabricate and test a thermal vacuum panel is an example only and the invention is not limited to such specific methods described herein.

DESCRIPTION OF THE PREFERRED EMBODIMENTS

Figures 1, 2, 3:
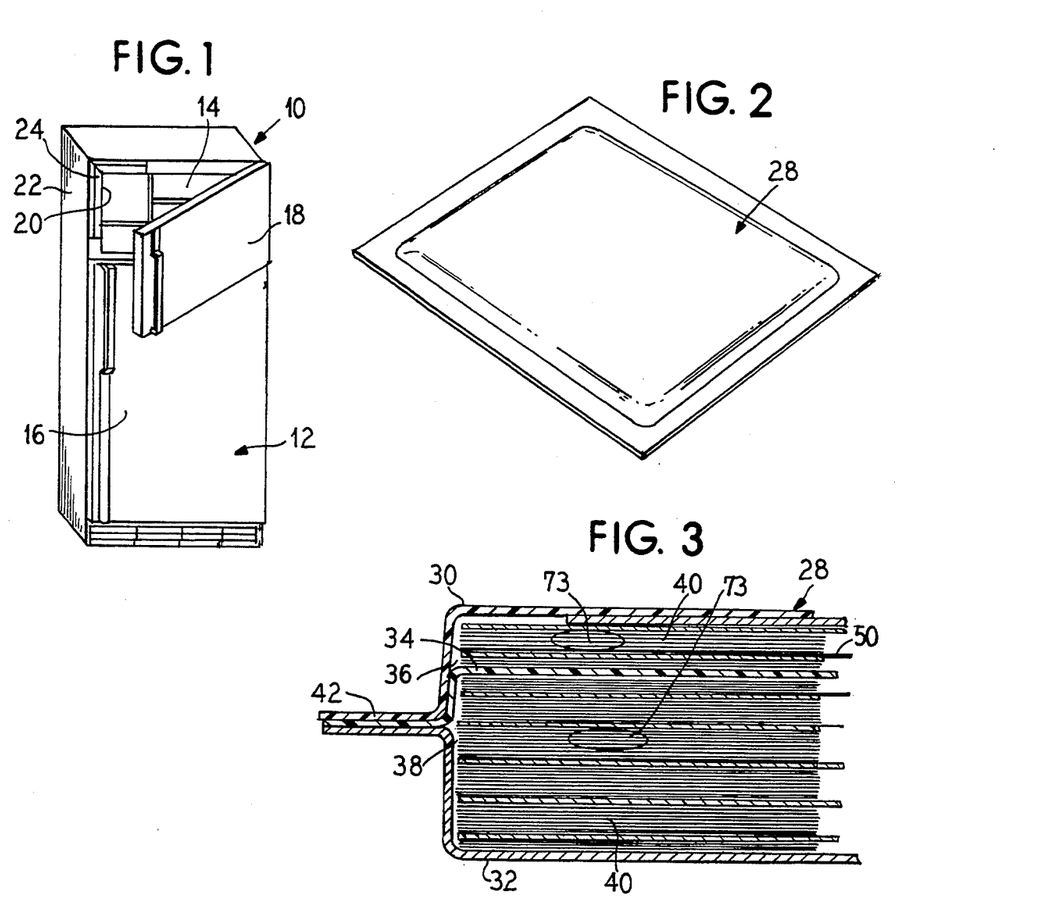
FIG. 1 is a perspective view of a refrigerator appliance which includes a vacuum thermal insulation panel embodying the principles of the present invention.
FIG. 2 is a perspective view of a vacuum insulation panel embodying the principles of the present invention.
FIG. 3 is a side sectional view of a two compartment fiber filled vacuum insulation panel injected with helium.

In FIG. 1 there is illustrated a refrigeration appliance generally at 10 in which the present invention finds utility, and which comprises a refrigeration compartment 12 and a freezer compartment 14 located above the refrigerator compartment 12.

Each of the refrigerator compartments 12, 14, are accessed by means of a separate door 16, 18. The compartments are defined by an interior wall or liner 20 which is spaced within an exterior outer shell 22, comprising the refrigeration appliance cabinet. A space 24 between the interior wall 20 and the shell 22 is generally filled with an insulation material such as polyurethane foam which is injected into the space 24 in a liquid state where it expands and hardens into a porous solid state to form a structural part of the cabinet as well as providing a thermal barrier necessary to prevent rapid warming of the interior compartments.

The present invention, in a preferred embodiment, provides an improved vacuum thermal insulation panel 28 (FIG. 2) which is to be inserted in the space 24 (FIG. 1) between the liner 20 and the shell 22 to enhance the insulation property of the insulation system. Vacuum insulation panels may be placed in other thermally sensitive areas throughout the appliance 10 as required. Polyurethane foam is used to provide additional insulation, the structural support it normally provides and to assist in holding the panels 28 in place between the walls 20, 22.

The particular vacuum thermal insulation panel illustrated is only a single example of a type of device that could utilize the present invention. Other environments where the sealed integrity of an enclosure or container must be assured could also benefit from the use of the present invention irrespective of whether the container is evacuated.

The particular placing and usage of such vacuum panels is disclosed in pending patent application Ser. No. 452,063 entitled "VACUUM INSULATION PANEL SYSTEM FOR INSULATING REFRIGERATION CABINETS", now U.S. Pat. No. 5,082,335, assigned to the assignee of the present invention. That disclosure is incorporated herein by reference and further discussion of the use of such panels will not be contained herein.

Each vacuum insulation panel 28 is constructed with a pair of highly permeation resistant outer film walls 30, 32 (FIG. 3) and may have one or more gas permeation resistant inner wall(s) 34. Although the barrier film walls are defined as being gas impermeable or permeation resistant, in reality they do have a very limited permeability. In a typical vacuum insulation panel, permeability of oxygen should be such that less than 10 mm Hg pressure is built up over the life of the product (for most insulation fillers used in vacuum panels).

Figure 4:
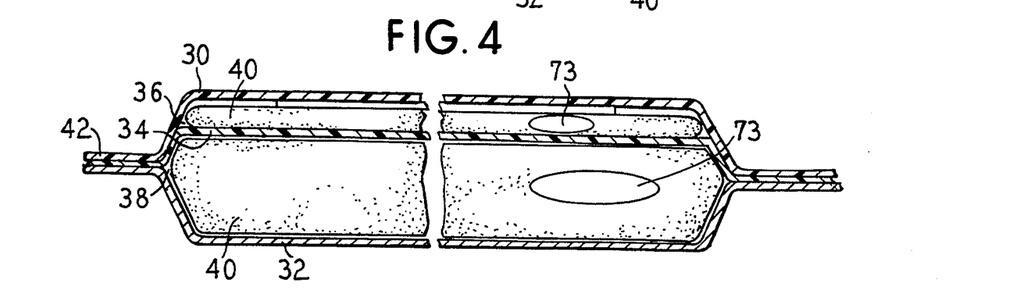
FIG. 4 is a side sectional view of a powder filled two compartment vacuum insulation panel injected with helium.

If a single gas impermeable inner wall 34 is used, then two adjacent compartments 36, 38 (FIG. 3) are created enclosing one or more insulation filler materials 40 that support the film walls 30, 32, 34 of the panel 28 when atmospheric gases are evacuated from the interior compartments 36, 38 of the panel 28. The pressure differential across the inner wall 34 is very small, while the pressure differential across either of the outer walls 30, 32 will be approximately equal to atmospheric pressure. The insulating filler material(s) 40 may be in the form of individual sheets of fibrous material such as glass fiber insulation as illustrated in FIG. 3 or may be in the form of a microporous powder material (FIG. 4), or a mixture of various insulation materials, as described in pending application Ser. No. 451,830, now U.S. Pat. No. 5,018,328 entitled "MULTI-COMPARTMENT VACUUM INSULATION PANELS", assigned to the assignee of the present invention. The disclosure of that application is incorporated herein by reference. Of course, any other form and combination of microporous, other porous, or any other filler insulation material may be employed in a compartment or various compartments of the vacuum insulation panel 28.

The two outer walls 30, 32 and inner wall 34 (FIG. 3), are hermetically sealed to each other about their edges or periphery 42 to define the two vacuum sealed compartments 36, 38 (FIG. 3). The primary function of the compartment walls 30, 32, 34, made of flexible barrier films, is to inhibit gas and water vapor permeation into the vacuum panel 28, thereby maintaining the proper vacuum level achieved during its manufacture through evacuation prior to the sealing of the peripheral edges 42 of the panel to form the vacuum insulation compartments. Particular barrier films best suited for forming a vacuum insulation panel are described in pending application Ser. No. 451,830, entitled "MULTI-COMPARTMENT VACUUM INSULATION PANELS". Such laminate barrier films have the best permeability characteristics, that is, will maintain the vacuum conditions within the panel for the longest period of time.

Figure 5:
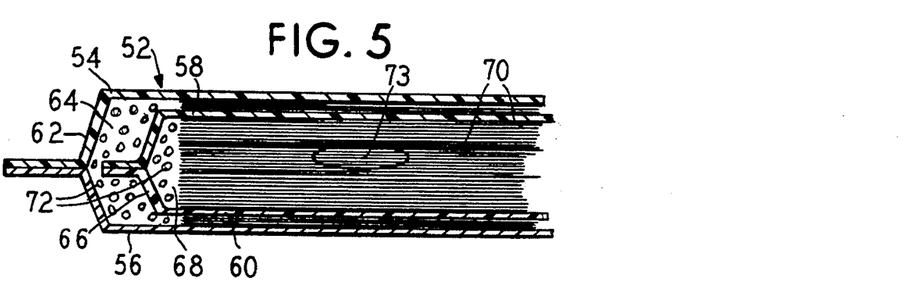
FIG. 5 is a side sectional view of a variation of two compartment fiber filled vacuum insulation panel containing helium that embodies the principles of the present invention.

An alternative construction for the vacuum insulation panel is shown at 52 in FIG. 5 wherein four separate layers 54, 56, 58 and 60 are formed and comprise two completely independent sealed bags. An outer bag 62 defining an outer compartment 64 is formed by layers 54 and 56 which completely encapsulates and surrounds an internal bag 66 defining an inner or main compartment 68 formed by layers 58 and 60. Within each bag 62, 66 there is a porous filler material 70 as described above.

It may be desirable to provide within the sealed panels 28, 52 materials to absorb or otherwise interact with gases and vapors that are able to permeate the film walls 30, 32, 54, 56 of the panel. Such materials are known as getters 72 (FIG. 5) and are described in greater detail in pending patent application Ser. No. 452,068, now U. S. Pat. No. 5,091,233, entitled "GETTER STRUCTURE FOR VACUUM INSULATION PANELS", assigned to assignee of the present invention. The disclosure of that patent application is incorporated herein by reference.

To test the hermetic seal and integrity of the panel film to assure that the manufactured panel 28 will remain hermetically sealed and thus impervious from the external environment for the life of a refrigerator (approximately 20 years or more), a low molecular weight, easily detectable gas 73 (FIGS. 3, 4 and 5), such as helium is introduced into the interior 36, 38, 64, 68 of the vacuum panel before it is sealed (although the depiction of the gas 73 in the figures is schematically shown as a bubble, in fact the gas will be evenly dispersed throughout the entire interior area). Of course, this application is not limited to the use of the helium, any low molecular weight gas may be used, but preferably one that is inert and easily detectable.

The helium is introduced into the interior 36, 38, 64, 68 of the vacuum panel at a pressure substantially less than atmospheric pressure and at a pressure level not high enough to damage the thermal performance of the panel. The helium pressure, however, must be high enough such that a test pump can rapidly evacuate a test chamber below the helium pressure. Generally less than 2 millimeters (mm) of mercury (Hg), and preferably 1 mm Hg will satisfy these requirements for precipitated silica fillers. For fillers such as fumed silica, the optimum pressure of the helium may go as high as 5 mm Hg. The vacuum insulation panel is then hermetically sealed about its periphery and tested for helium leaks. Because helium has a high mobility nature, the gas 73 will escape the interior 36, 38, 64, 68 of the vacuum panel 28 either by permeation or hydrodynamics.

Figure 8:
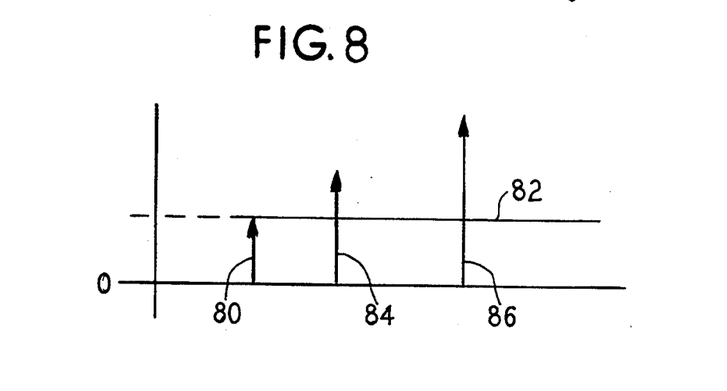
FIG. 8 is a schematic illustration of detected levels of escaped helium for certain conditions.

In FIG. 8 there are illustrated, schematically, three different levels of the rate of helium gas escape from the interior of the vacuum panel. A first amount indicated by arrow 80 represents a normal permeation rate of gas escape for a panel, thus representing a leak rate indicated by line 82 which Applicants have determined to be approximately in the range of $1 \times 10^{-7}$ atm cc/sec. (actually this rate can vary based on the size and the number of vacuum panels tested and barrier material characteristics). A second, higher leak rate indicated by arrow 84 represents an excessive amount of permeation generally caused by some fault in the film material forming the walls of the panels. This film fault does not rise to the level of an actual pin hole leak, but rather is a defect in the chemical characteristics of the film allowing a larger than acceptable permeation rate. The third arrow indicator 86 represents a rate of gas escape significantly greater than that permissible and would represent a hydrodynamic leak generally caused by an actual pin hole in the wall of the film or in the seal area.

In order to check the panels for leakage, Applicants have developed a method for individually testing each of the panels in a manner which can be accomplished in a very quick and yet reliable fashion. In this method the vacuum panels are filled with the microporous insulation and evacuated in a vacuum chamber, then a small amount of low molecular weight gas, such as helium, is introduced into the panel at a pressure level substantially less than atmospheric pressure and below that which would cause damage to the thermal performance of the panel. Since helium and other low molecular weight gases have high thermal conductivity compared to large molecular gases, it is necessary to keep the pressure of the introduced gas very low. The gas pressure, however, must be high enough that a test pump can rapidly evacuate a test chamber below the introduced gas pressure and also the gas pressure should result in a partial pressure greater than that which the gas has in the ambient atmosphere of the test chamber.

Figure 6:
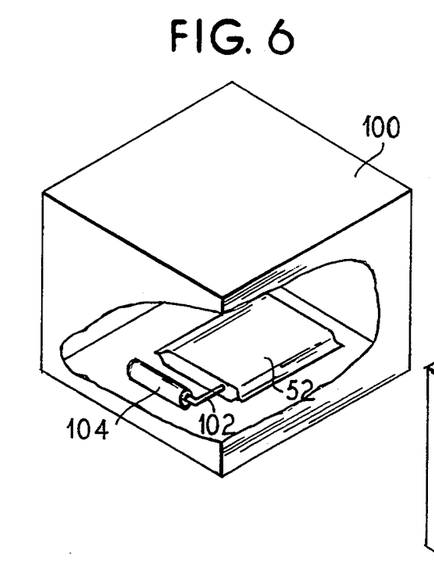
FIG. 6 is a perspective view showing a vacuum chamber wherein a vacuum thermal insulation panel, or panels, can be injected with helium.

A number of different approaches to introducing such a gas, preferably helium, to the interior of the panel are available. In a first embodiment, illustrated in FIG. 6, an evacuated assembly chamber 100 is provided in which the vacuum insulation panel is first filled with the evacuated insulating material, such as microporous powder, and then a probe 102 of a gas cylinder 104 is introduced into the interior of the panel to introduce the gas into the partially assembled, but not yet sealed panel. This first step is illustrated at step 106 in FIG. 10.

Figure 10:
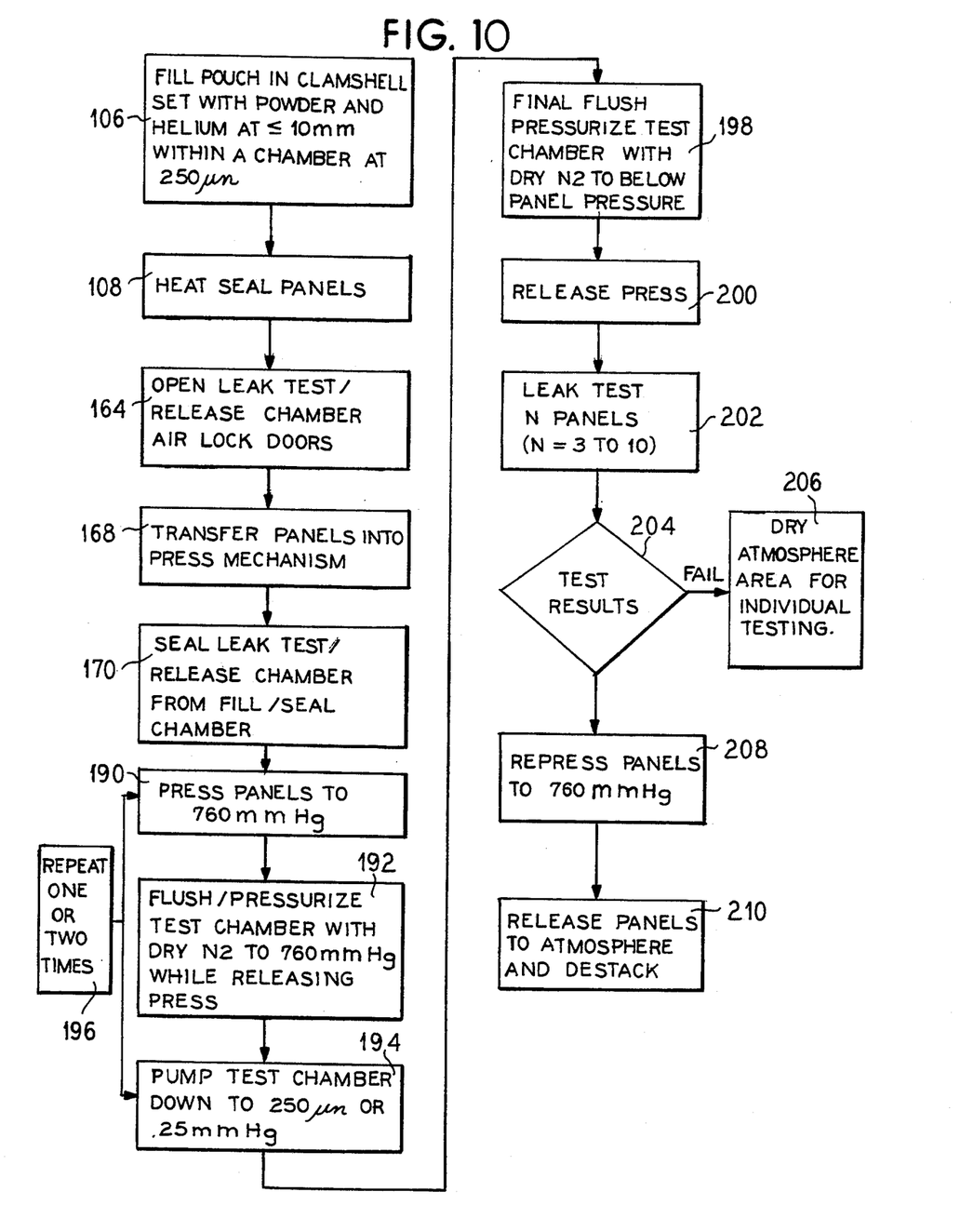
FIG. 10 is a flow chart diagram of the steps for testing vacuum insulation panels in accordance with the present invention during fabrication.
Figure 11:
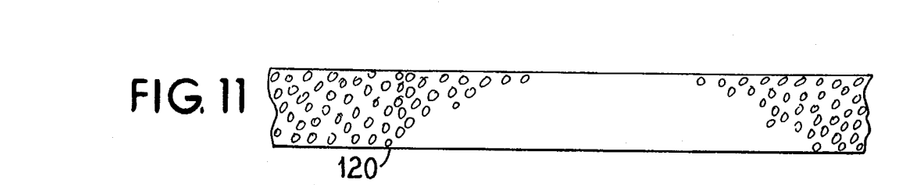
FIG. 11 is a side elevation view of a helium blown foam material for use in an alternative embodiment of the invention.

The next step illustrated in FIG. 10 at 108 is to heat seal the remaining open edge of the panel to seal the helium within the panel.

Figure 7:
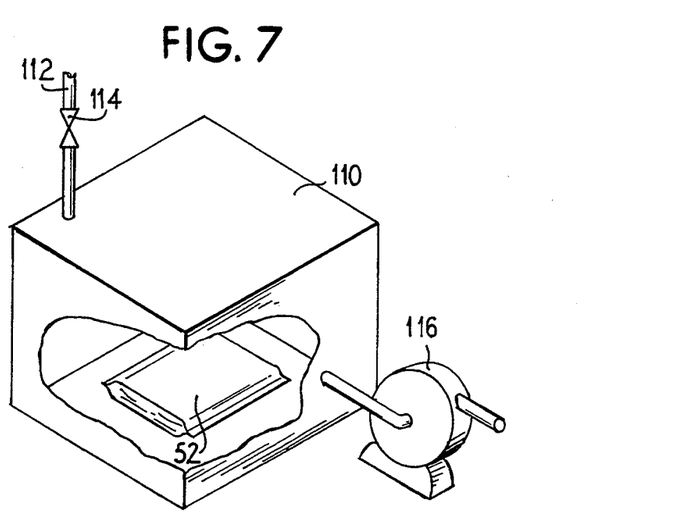
FIG. 7 is a perspective view showing another vacuum chamber wherein a vacuum thermal insulation panel or panels can be injected with helium.

A second embodiment of the invention regarding the filling of the panel with helium is illustrated in FIG. 7 wherein an assembly chamber 110 can be evacuated while the panel is filled with the insulation material. Subsequently the chamber is flooded with the helium gas through a conduit 112 operated by a valve 114. A pump 116 is used to evacuate the chamber and to allow a full flushing of helium gas into the chamber. Again, the pressure of helium gas in the chamber will be well below one atmosphere and preferably will be in the range of approximately 1 mm Hg.

Figures 12, 13, 14, 17, 18, 19:
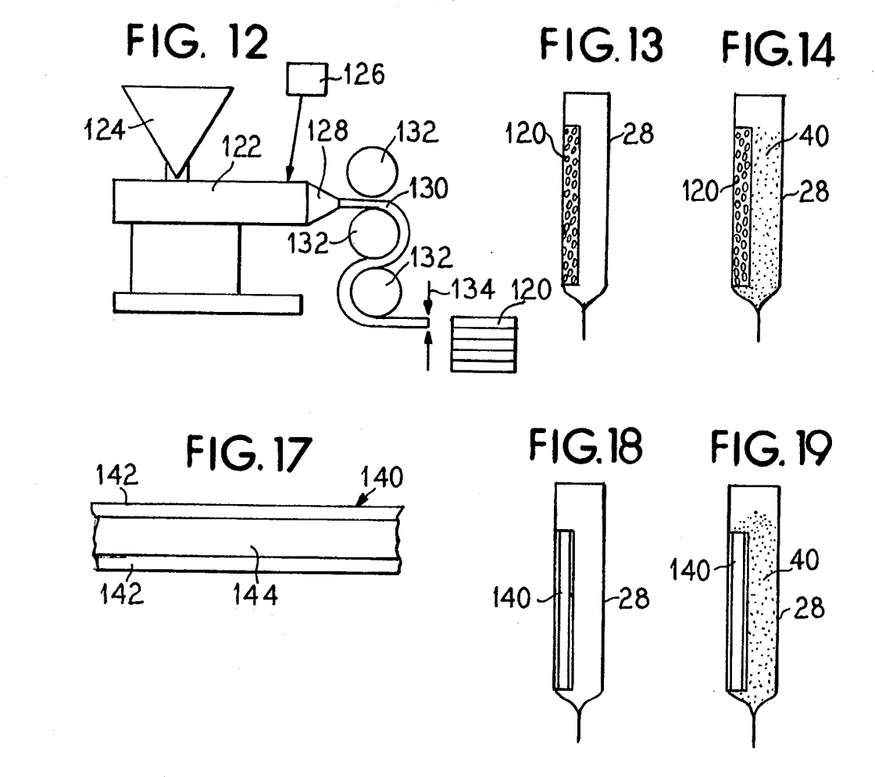
FIG. 12 is a schematic illustration of an apparatus for fabricating the foam of FIG. 11.
FIGS. 13–15 illustrate successive steps in fabricating a vacuum insulation panel incorporating the foam of FIG. 11.
FIG. 17 is a schematic illustration of a plastic laminate for use in an alternative embodiment of the present invention.
FIGS. 18–20 illustrate sequential steps in the fabrication of a vacuum insulation panel embodying the laminate film of FIG. 17.
Figure 15:
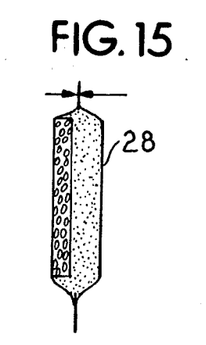
Figure 16:
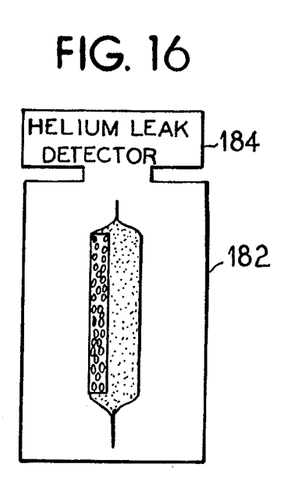
FIG. 16 is a schematic illustration of a test chamber for the vacuum insulation panel of FIG. 15.

Further alternate methods for introducing helium to the interior of the vacuum panel are illustrated in FIGS. 11–21. In FIGS. 11–16 there is shown an arrangement whereby a helium source in the form of a thin strip of helium blown foam 120 (FIG. 11) is produced in an extruder 122 which receives a material, such as a thermoplastic, for example, polystyrene, which is fed in from a hopper 124 to the extruder. A source 126 of helium at high pressure communicates with the extruder barrel 122 and is mixed with the plastic. The mix is then extruded from a die 128 as in 130 into a sheet, strand or some other convenient shape. Upon exiting the die 128, the molten plastic foams due to the high pressure helium contained it. The foam is directed through a series of chill rolls 132 and is directed past a cutter mechanism 134 and then assembled in stacks or other transportable form. During the assembly of the vacuum panel, the foam strip 120 will be placed in the interior of the vacuum panel (FIG. 13) prior to introduction of the filler material 40 as shown in FIG. 14. The vacuum panel is subsequently heat sealed as schematically illustrated in FIG. 15.

Figures 20, 21:
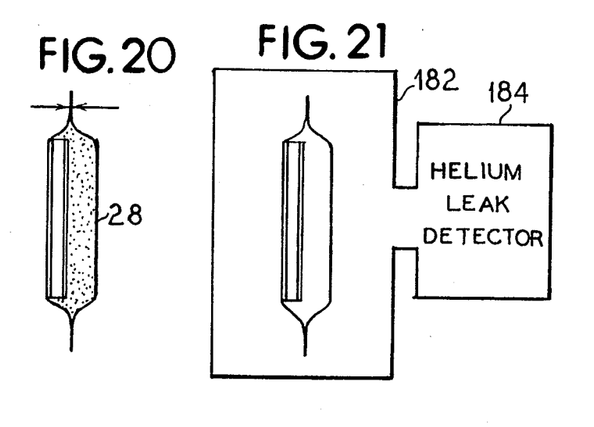
FIG. 21 is a schematic illustration of a test chamber for testing the vacuum insulation panel of FIG. 20.

A still further embodiment of the invention is illustrated in FIGS. 17–21 in which a helium source in the form of a helium pellet 140 is formed by exposing a piece of plastic to helium which will rapidly dissolve into the plastic so as to form a reservoir of helium that can be transferred into the vacuum panel pouch. This occurs since helium is soluble and it easily permeates plastics. A strip of a plastic laminate material having an upper and lower diffusion control layer 142, formed for example of PET, surrounds an interior helium solution layer 144 which for example may be EP rubber. The pellet is first placed into a helium saturation chamber so that the interior layer 144 will absorb a desired amount of helium. Then the pellet 140 will be introduced into the vacuum panel as shown in FIG. 18 prior to insertion of the filler material 40 as illustrated in FIG. 19. Subsequently, the vacuum panel will be heat sealed closed as schematically illustrated in FIG. 20.

Figure 9:
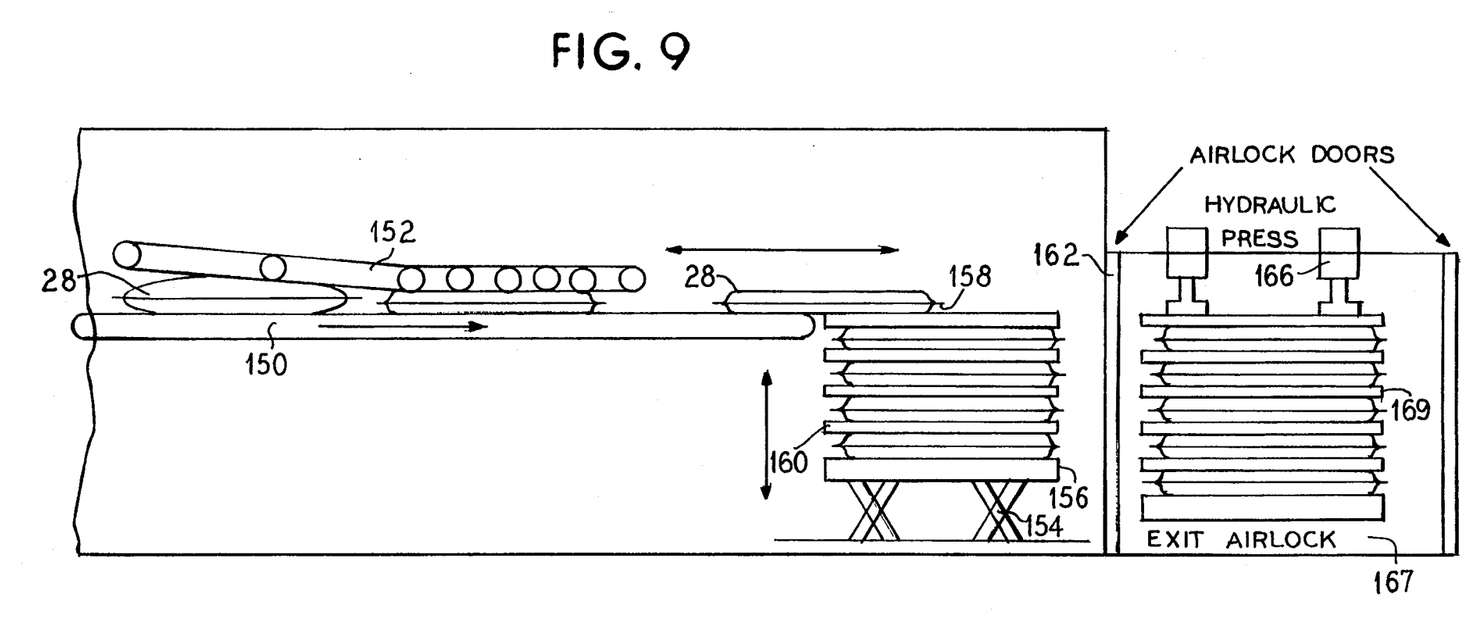
FIG. 9 is a side elevation view of an example of an apparatus for assembling and testing vacuum insulation panels during manufacturing.

In a preferred embodiment of the invention, regardless of the manner in which the helium is introduced into the interior of the panel, the remaining open edge of the panel is heat sealed to seal the helium gas, at pressures below 10 mm Hg, within the evacuated panels. Then the vacuum panel in the form of a pouch is transferred, as illustrated in FIG. 9 to a flat conveyor 150. The panel is conveyed on the flat conveyor 150 through a pinch type flat upper conveyor 152 to uniformly distribute the powder within the panel. If filler materials other than powder are utilized, this step may not be necessary.

Following the panel flattening conveyor 152, an elevator 154 with a pallet 156 is staged in an upper position to accept a first panel. When a panel is sensed in the transfer position, a gripper (not shown) closes on a leading edge 158 of the panel and positions the panel on the pallet 156 and the transfer device moves to the incoming pallet and plate position. A plate 160 is then picked up and placed on top of the panel and the elevator is lowered to accept the next panel of the stack. This process continues until a stack of panels and plates are complete. When the pallet stack is complete, the elevator lowers to the pallet transfer position and an air lock door 162 opens. Once the pallet transfer is complete a new pallet is transferred onto the elevator and the process is repeated.

The opening of the air lock door 162 is indicated at step 164 in FIG. 10. The panels are then transferred to a hydraulic press mechanism 166 in an air lock chamber 167 as indicated at step 168 in FIG. 10. The air lock door 162 is then sealed as indicated at step 170 in FIG. 10. Once the completed pallet is conveyed into the air lock chamber 167, the press mechanism 166 extends to exert pressure on the panel and plate stack. This force is required to keep the panel stack flat during the time that the air lock chamber 167 is returning to atmospheric pressure, the hydraulic press 166 retracts and the pallet is conveyed to a position for further processing.

Three approaches are available for leak testing. A first is a sniffer testing approach which utilizes a probe to take a continuous sample of gases surrounding the tip of the probe. Such an approach is suited for testing parts which have a common potential leak site and is not particularly useful in testing the overall integrity of the panel. For a vacuum enclosure, this sniffer method can detect only the leaks due to permeation, not the hydrodynamic leaks. A second method of testing is accumulation testing which is a version of sniffer testing. This approach relies on enclosure of the panels and all of the emitted helium from all of the leaks. The actual test consists of closing the enclosure once a specified number of panels are inside, waiting for the concentration of helium to increase to a detectable level, then sampling the contents of the enclosure through a sniffer probe that is located within the enclosure. Mixing of the gas inside the enclosure is required to aid in the diffusion of the helium so that the concentration at the sniffer probe is an accurate representation of the total level. The required dwell time for such a testing procedure is sufficiently high so as to cause a serious slow down in the manufacturing process.

A third approach, which is preferred for high speed, high volume testing, is vacuum assisted testing. Two major advantages in evacuating a chamber, such as chamber 182 of FIGS. 16 and 21, in which to test the panels are: first, the dispersion rate of the helium within the enclosure is increased by eliminating the dense air; second, the background concentration of helium can be dramatically reduced within the vacuum chamber. Thus, the interference caused by the naturally occurring helium in air can be controlled. This method is suited for a production application because the vacuum pumps can be sized given the chamber tare volume and the cycle time required to maintain throughput.

Figure 22:
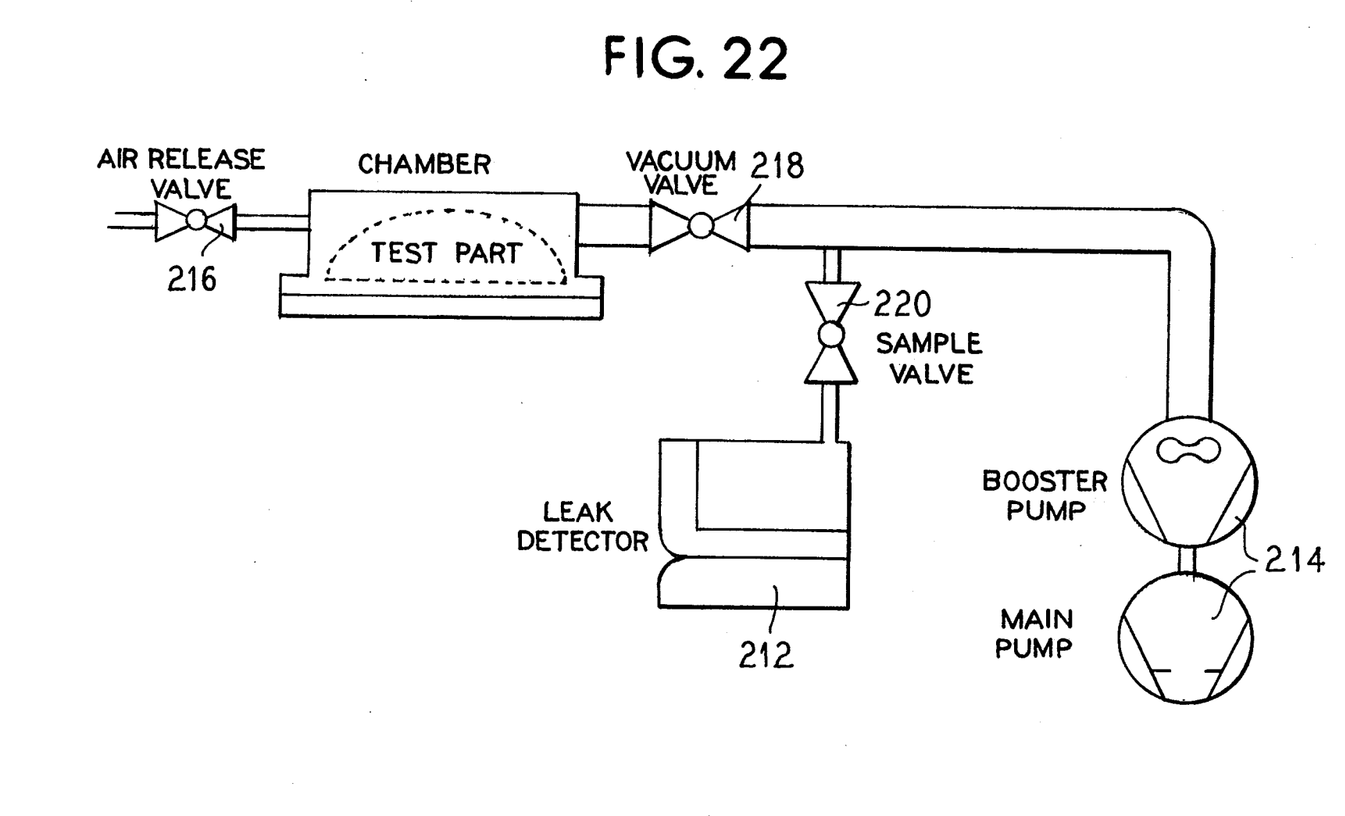
FIG. 22 is a relative layout of a test system to test vacuum panels.

The relative layout of an example of this type of equipment is shown in FIG. 22. It consists of a vacuum chamber 210, a leak detecting device 212, one or more auxiliary vacuum pumps 214 and valves 216, 218, 220 and controls (not shown in FIG. 22).

In order to reduce the background helium concentration to make leak detection possible, the stack of panels are placed in the test chamber 210 and pressed together by a press mechanism, similar to that shown in FIG. 9, to constrain the panels as the pressure within the test chamber fluctuates. This step is illustrated at 190 in FIG. 10. Subsequently the test chamber is flushed and pressurized to 760 mm Hg with a non-helium gas, preferably dry nitrogen as indicated at step 192 and then the test chamber is again evacuated as shown at step 194. As indicated at step 196, this process may be repeated one or two times to assure a complete flushing of background helium from the test chamber.

A final flush of the test chamber with dry nitrogen is indicated at step 198, this time the flushing with dry nitrogen will occur at a pressure level below the internal pressure of the panels. The hydraulic press is then released as indicated at step 200 and the panels are then tested for leakage as indicated at step 202.

As indicated above, the leakage may be one of two types. A hydrodynamic leak, generally caused by an actual hole in the panel or the seal is caused by a flow in the direction of the total pressure gradient and is proportional to the difference in pressures. Thus, if the test chamber pressure is below that of the internal pressure of the panel, gas will be caused to flow out of the panel signifying a hydrodynamic leak.

A permeation-related gas flow is characterized by flow in the direction of a concentration gradient. Such a gas flow would indicate a higher rate of permeation through the panel than is acceptable and would indicate defective laminate film. In order to drive permeation gas flow from the interior panel to exterior of the panel, the concentration of helium within the test chamber should be significantly less than that inside the panel.

Figure 23:
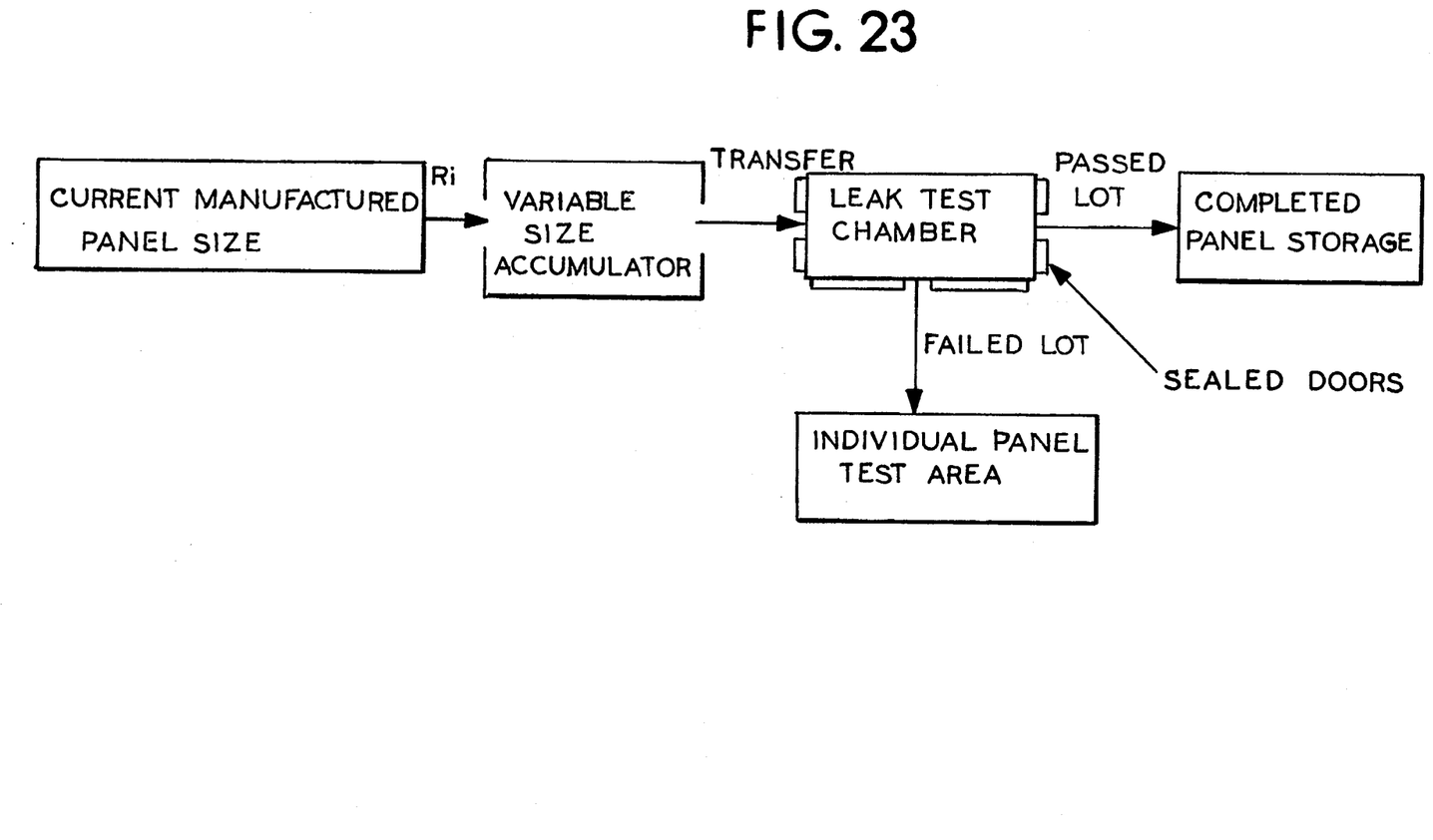
FIG. 23 is a flow diagram of the vacuum panel test system operation.

A leak detector 184, such as Leybold UL 500 Ultra Test Leak Detector would then be used to determine the level of helium within the chamber. If the level of helium increases at a rate which exceeds a range around $1 \times 10^{-7}$ atm cc/sec, then as indicated at step 204, this would indicate a failed test and the stack would be transferred to a dry atmosphere area for individual testing of the panels within the stack as indicated at step 206. A flow diagram of the vacuum panel test operation is shown in FIG. 23. The acceptable helium leak rate will very much depend on the panel design and the barrier films used in the panel construction. A failure is indicated by a flow greater than the film's specific permeability. If the stack of panels passes the test, then as indicated at step 208, the panels would again be re-pressed by the hydraulic press to a one atmospheric level, the chamber would be filled with normal atmosphere, and the panels would be released as indicated at step 210 and de-stacked and moved to an area for inclusion within the refrigerator cabinets.

It should be noted that the helium gas will also continuously diffuse out of the vacuum panels during the life of the package. This will eventually eliminate the slight degradation of the panel thermal conductivity caused by the presence of helium gas.

Thus it is seen that the present invention provides a container, which in a preferred arrangement is an evacuated container, having hermetically sealed walls forming at least one inner compartment in the compartment containing an amount of low molecular weight gas sufficient to raise the partial pressure of the gas to a predetermined level above its atmospheric partial pressure level but at a substantially lower pressure than atmospheric pressure. The invention also provides a method of verifying the integrity of a sealed container in which a low molecular weight gas is introduced to the interior of the container before sealing, the container is placed in a chamber which is then evacuated of the low molecular weight gas to a partial pressure level below that of the gas in the container and the chamber is also evacuated of all other gases to a total pressure level below that of the container. Then the gas within the chamber is sensed after the evacuations to determine whether the rate of increase of the low molecular weight gas in the chamber exceeds a predetermined rate. If the container is an evacuated container, then it of course is necessary to evacuate the chamber to a pressure level below that of the evacuated container. This method is enhanced by introducing the low molecular weight gas to the interior of the container at a concentration level such that the partial pressure of the gas will be in excess of the normal atmospheric partial pressure of that gas. Further, the present invention provides an apparatus for verifying the integrity of the sealed container and for carrying out the steps of the above described method.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A method of verifying the integrity of a sealed evacuated container comprising a vacuum insulation panel having at least one flexible film wall, comprising the steps:

evacuating said container of gases to a below atmospheric pressure before sealing;
   introducing a low molecular weight gas to the interior of the container before sealing;
   introducing a quantity of microporous thermal insulating material into the interior of the container to substantially fill said container before sealing said container;
   placing said container in a chamber;
   sealing said container with said low molecular weight gas and said microporous thermal insulating material therein while maintaining the pressure within said container below atmospheric pressure;
   evacuating said chamber of said low molecular weight gas to a partial pressure level below that of said gas in said sealed container;
   evacuating said chamber of all gases to a pressure level below that within the container; and
   sensing the gas within said chamber after said sealing and said evacuations to determine whether the rate of increase of said low molecular weight gas in said chamber exceeds a predetermined acceptable leak rate.

2. A method according to claim 1, wherein said container is evacuated of gases to a predetermined pressure level prior to introducing said low molecular weight gas.

3. A method according to claim 1, wherein step of introducing said low molecular weight gas comprises introducing said gas in a concentration level sufficient to raise the partial pressure of said gas within said container above its normal atmospheric partial pressure.

4. A method according to claim 1, wherein said step of evacuating said chamber of said low molecular weight gas includes flushing said chamber with one or more gases from a group not including said low molecular weight gas.

5. A method according to claim 1, wherein said low molecular weight gas is helium.

6. A method according to claim 1, wherein said step of introducing said low molecular weight gas to said container is accomplished by one of the steps from the group consisting of:

(a) directing a stream of concentrated low molecular weight gas into the interior of said container;
   (b) placing said container in a chamber and flooding said chamber with a high concentration of said low molecular weight gas;
   (c) dissolving an amount of said low molecular weight gas in a plastic material and inserting said plastic material into said container; and
   (d) inserting a foam strip with cells containing said low molecular weight gas into said container.

7. A method according to claim 1, wherein a plurality of containers are placed in said chamber for simultaneous sensing.

8. An apparatus for verifying the integrity of a sealed container comprising a vacuum insulation panel having at least one flexible film wall, comprising:

means for evacuating said container of gases to a below atmospheric pressure before sealing;
   means for introducing a microporous thermal insulating material into said container to substantially fill an interior of said container;
   means for introducing a low molecular weight gas to the interior of the container before sealing;
   means for maintaining the pressure within said container, after introduction of said low molecular weight gas and said microporous insulating material, below atmospheric pressure while effecting a seal of said container;
   means for placing said container in a chamber;
   means for evacuating said chamber of said low molecular weight gas to a partial pressure level below that of said gas in said container;
   means for evacuating said chamber of all gases to a pressure level below that of the container; and
   means for sensing the gas within said chamber after said sealing and said evacuation to determine whether the rate of increase of said low molecular weight gas in said chamber exceeds a predetermined acceptable leak rate.

9. An apparatus according to claim 8, further including means for evacuating said container of gases to a predetermined pressure level prior to introducing said low molecular weight gas.

10. An apparatus according to claim 8, wherein said means for introducing said low molecular weight gas comprises means for introducing said gas in a concentration level sufficient to raise the partial pressure of said gas within said container above its normal atmospheric partial pressure.

11. An apparatus according to claim 8, wherein said means for evacuating said chamber of said low molecular weight gas comprises means for flushing said chamber with one or more gases from a group not including said low molecular weight gas.

12. An apparatus according to claim 8, wherein said chamber is large enough for receiving a plurality of containers simultaneously.

13. An apparatus for verifying the integrity of a sealed container comprising a vacuum insulation panel having flexible film walls, comprising:

means for evacuating said container of gases to a pressure below 5 mm Hg before sealing;
   means for introducing a microporous thermal insulating powder into said container to substantially fill an interior of said container;
   means for introducing a low molecular weight gas to the interior of the container before sealing;
   means for maintaining the pressure within said container, after introduction of said low molecular weight gas and said microporous insulating powder, below atmospheric pressure while effecting a seal of said container;
   means for placing said container in a chamber;

means for evacuating said chamber of said low molecular weight gas to a partial pressure level below that of said gas in said container;
means for evacuating said chamber of all gases to a pressure level below that of the container; and
means for sensing the gas within said chamber after said sealing and said evacuation to determine whether the rate of increase of said low molecular weight gas in said chamber exceeds a predetermined acceptable leak rate.

* * * * *